C. W. WINCHELL.
TEA AND COFFEE POT.
APPLICATION FILED FEB. 10, 1914.
1,148,422.
Patented July 27, 1915.
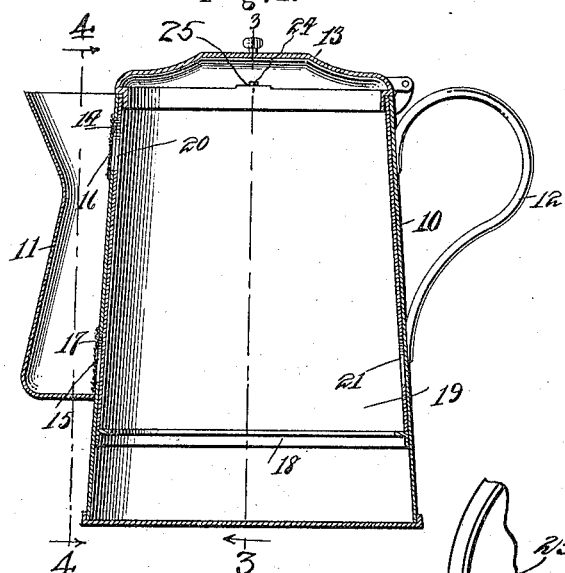
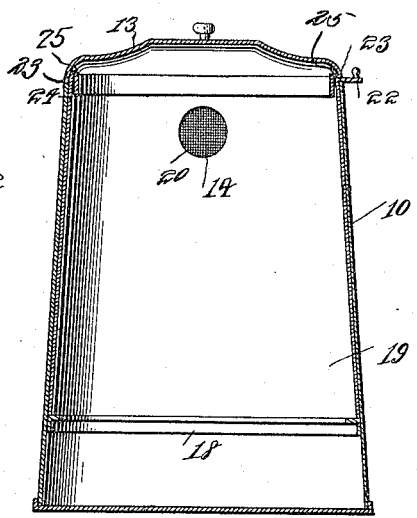
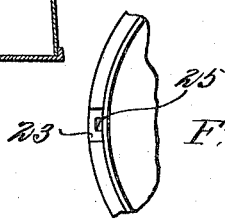
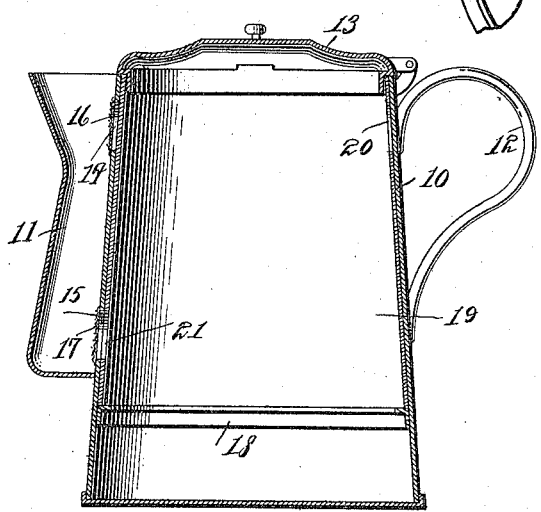
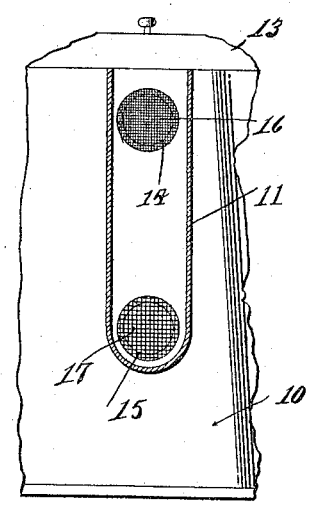
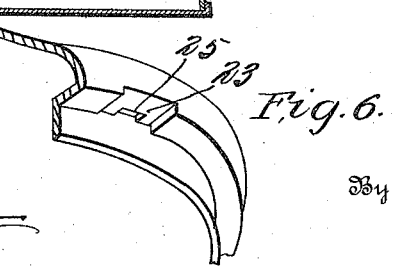
Witnesses
Frederick N. Saylor
Inventor
Charles W. Winchell.
By Victor J. Evans
Attorney

UNITED STATES PATENT OFFICE.

CHARLES W. WINCHELL, OF GENEVA, NEW YORK.

TEA AND COFFEE POT.

1,148,422.  Specification of Letters Patent.  Patented July 27, 1915.

Application filed February 10, 1914. Serial No. 817,881.

*To all whom it may concern:*

Be it known that I, CHARLES W. WINCHELL, a citizen of the United States, residing at Geneva, in the county of Ontario and State of New York, have invented new and useful Improvements in Tea and Coffee Pots, of which the following is a specification.

An object of the invention is to provide a tea or coffee pot of a simple construction which can be used either for tea or coffee.

The invention contemplates, among other features, the provision of a tea or coffee pot which includes an inner movable member that is adapted to be arranged in one position relatively to the pot body when the pot is used for coffee and in another position relatively to the pot body when the pot is used for tea, with means for insuring the proper position of the inner movable member with respect to the pot body for the purposes mentioned.

In the further disclosure of the invention reference is to be had to the accompanying drawings, constituting a part of this specification, in which similar characters of reference denote corresponding parts in all the views, and in which:

Figure 1 is a vertical sectional view of the tea or coffee pot, showing the position of the inner movable member when the pot is used for coffee; Fig. 2 is a similar view showing the position of the inner movable member when the pot is used for tea; Fig. 3 is a vertical transverse sectional view taken through the coffee pot on the line 3—3 in Fig. 1; and Fig. 4 is a fragmentary vertical sectional view taken on the line 4—4 in Fig. 1. Fig. 5 is a detailed section of the cover. Fig. 6 is a detail perspective view of a portion of the cover.

Referring more particularly to the views, I disclose a body 10 in the nature of a receptacle, and which carries the usual spout 11, handle 12, and swinging cover 13 provided to normally close the body 10. A plurality of upper and lower openings 14 and 15 respectively are formed in the wall of the body 10 in order to afford communication between the interior of the body and the spout 11 and the said upper and lower openings 14 and 15 are preferably covered by suitable strainers 16 and 17 respectively.

A substantially circular support 18 is rigidly secured within the body 10, a distance from the lower end thereof, and lying within the body 10 and rotatably supported on the support 18 is an inner member 19 of a substantially cylindrical construction, the said member 19 being provided with an upper opening 20 adapted for registration with the upper opening 14 and with a lower opposed opening 21 adapted for registration with the lower opening 15. It will be seen by referring to the views that the two openings 20 and 21 cannot register with the respective openings 14 and 15 at the same time and that when one of the openings of the member 19 registers with one of the openings of the body 10 the other opening of the member 19 will be closed by the wall of the body 10.

A handle 22 is swingingly supported upon the upper end of the inner member 19, with the said handle adapted to project laterally through a recess 23 formed in the cover 13 of the body 10 so that the handle will lie exteriorly of the body and cover. A stop flange 24 projects upwardly from the upper end of the body 10 in diametrical relation to the handle 22, and the said stop flange 24 is also adapted to project into a recess 25 formed in the cover 13 and in diametrical relation to the recess 23. It will now be seen that when the handle 22 and stop flange 24 project into recesses 23 and 25 respectively any turning movement of the inner member will be prevented and the said inner member will be locked relatively to the body when the cover 13 is in closed position on the body. By simply raising the cover a slight distance and grasping the handle 22 it will be apparent that the inner member can be rotated within the body so as to bring the upper opening 20 or lower opening 21 into registration with the upper or lower openings 14 and 15, respectively, of the body 10.

It should be strictly noted that when the pot described is used for coffee the upper opening 14 is employed to establish communication between the interior of the pot and the spout, and, therefore, it is necessary to rotate the inner member 19 until the upper opening 20 thereof registers with the upper opening 14. When this is done, it will be apparent that the lower opening 15 of the body 10 will be closed by the wall of the inner member 19 and the lower opening 21 of the member 19 will be closed by the wall of the body 10 so that the only exit for the coffee which is subsequently brewed in the pot will be through the registering openings 14 and 20. Inasmuch as the opening 14 is covered by the strainer 16 when the cover 13 is in closed position will be held against rotation or accidental displacement in the body 10 by providing the handle and stop flange 24, fitting into the respective recesses 23 and 25 of the cover. Now if it is desired to use the pot for tea, the cover 13 is first raised and then by grasping the handle 22 and rotating the inner member 19 the same will be positioned with respect to the body so that the lower opening 21 of the member will register with the lower opening 15 of the body, thus closing the upper opening 14 of the body and the upper opening 14 of the member 19, as shown. The tea is now made in the usual manner and is poured through the registering openings 15 and 21, of which the opening 15 is covered by the strainer 17 so that the tea will be properly strained as it passes from the interior of the body into the spout.

It will be apparent that the strainers 16 and 17 can be of different sizes in that the strainer 16 will be of a fine mesh in order to properly strain the coffee and the strainer 17 can be of a coarser mesh for properly straining the tea without preventing its proper flow from the body into the spout. By having the coffee exit or opening 14 through which the coffee flows near the upper end of the body, the said exit for the coffee from the body to the spout will not become clogged by the coffee grounds and which settle to the bottom of the coffee pot. In the event that tea is brewed in the pot, it is advisable to have the opening near the bottom, as in the instance shown when the opening 15 constitutes the exit for the tea, for the reason that the tea leaves tending to float will not hamper the proper pouring of the tea from the pot when the tea is made.

From the foregoing construction it will be seen that the device described is of a simple construction, consists of few parts, can be readily cleaned and is readily adaptable for use in making tea or coffee.

Having thus described my invention, I claim:

1. In a tea or coffee pot, the combination with a body having upper and lower openings common to the interior of the body, of a spout carried by the body and with which the openings communicate, said openings being common to the interior of the spout, a member movably carried within the pot and provided with a plurality of opposed upper and lower openings so arranged that one of the openings of the said member will be out of registration with one of the openings of the pot when the other opening of the said member is in registration with the other opening of the pot, and means on the member and movable therewith to be associated with the body whereby to lock the member rigidly against movement relatively to the body.

2. In a tea or coffee pot, the combination with a body having superposed openings common to the interior of the body, of a spout on the body and having the openings common to the interior thereof, a member movable within the body and having superposed openings arranged relatively to the openings in the body, whereby when one of the openings of the member is out of registration with one of the openings of the body, the other opening of the member will be in registration with the other opening of the body, a handle projecting from the member and passing through a recess in the body, and a stop lug projecting from the body and adapted to be engaged by the handle to limit the rotation of the member within the body.

In testimony whereof I affix my signature in presence of two witnesses.

CHARLES W. WINCHELL.

Witnesses:
ARTHUR HAMLING,
T. MANING.

Copies of this patent may be obtained for five cents each, by addressing the "Commissioner of Patents, Washington, D. C."